United States Patent [19]
Merrill et al.

[11] Patent Number: 5,459,258
[45] Date of Patent: Oct. 17, 1995

[54] POLYSACCHARIDE BASED BIODEGRADABLE THERMOPLASTIC MATERIALS

[75] Inventors: Edward W. Merrill, Belmont; Ambuj Sagar, Cambridge, both of Mass.

[73] Assignee: Massachusetts Institute of Technology, Cambridge, Mass.

[21] Appl. No.: 203,952

[22] Filed: Mar. 1, 1994

[51] Int. Cl.$^6$ .................................................. C08B 37/00
[52] U.S. Cl. .................................................. 536/123
[58] Field of Search ..................................... 536/123

[56] References Cited

U.S. PATENT DOCUMENTS

| | | | |
|---|---|---|---|
| 4,352,883 | 10/1982 | Lim | 435/178 |
| 4,391,909 | 7/1983 | Lim | 435/178 |
| 4,689,293 | 8/1987 | Goosen et al. | 435/1 |
| 4,743,545 | 5/1988 | Torobin | 435/41 |
| 4,789,550 | 12/1988 | Hommel et al. | 424/493 |
| 5,095,054 | 3/1992 | Lay et al. | 524/47 |

OTHER PUBLICATIONS

Ferruti, P., "Synthesis and Exchange Reactions of Biodegradable Drug–Binding Matrices," *Makromol. Chem.*, 180:375–382 (1979).
Greene, T. W. and Wuts, P., "Protective Groups in Organic Chemistry," 2d Ed., John Wiley & Sons, Inc. (1991).
Gros. A. T. and Feuge, R. O., "Properties of the Fatty Acid Esters of Amylose," *J. Am. Oil Chemists Soc.*, 39:19–24 (1962).
Heller, J., et al., "Development of enzymatically degradable protective coatings for use in triggered drug delivery systems; derivatized starchhydrogels," *Biomaterials*, 11:345–350 (1990).
Herman, J., et al., "Modified starches as hydrophilic matrices for controlled oral delivery, I. Production and characterisation of thermally modified starches," *Int. J. Pharmaceutics*, 56:51–63 (1989).
Holland, S. J., et al., "Polymers for biodegradable medical devices. VII. Hydroxybutyrate–hydroxyvalerate copolymers; degradation of copolymers and their blends with polysaccharides under in vitro physiological conditions," *Biomaterials*, 11:206–215 (1990).
Kost, J. and Shefer, S., "Chemically–modified polysacchraides for enzymatically–controlled oral drug delivery," *Biomaterials*, 11:695–698 (1990).
Lynn, M. M., et al., "Synthesis and Biodegradability of Amylose Block Copolymers," *Papers Presented at Miami Meeting, ACS, Division of Polymer Chemistry, Inc.*, 19(2):106–111 (Sep. 1978).
Maddever, W. J. and Chapman, G. M., "Modified Starch Based Biodegradable Plastics," Conference Proceedings, Society of Plastics Engineers, 47th Annual Technical Conference & Exhibits, 1351–1355 (May 1989).
Maddever, W. J. and Chapman, G. M., "Modified Starch–Based Biodegradable Plastics," *Plastics Engineering*, 31–34 (Jul. 1989).
Pfannemüller, B., et al., "Attachment of (1–6)–Linked D–Glucose Side–Chains to Amylose and Cellulose via 1,2–Orthoesters," *Carbohydrate Res.*, 56:139–146 (1977).
Reed, A. M. and Gilding, D. K., "Biodegradable polymers for use in surgery—poly(glycolic)/poly(lactic acid) homo and copolymers: 2. In vitro degradation" *Polymer*, 22:494–498 (1981).
St. Lawrence Starch Co., "Biodegradable packaging plastics? How corny . . . ," *Food Engineering*, 29 (Jul. 1988).
Tay, S. W., et al., "Activity toward thrombin–antithrombin of heparin immobilized on two hydrogels," *Biomaterials*, 10:11–15 (1989).
Wolff, I. A., et al., "Triesters of Corn Starch, Amylose, and Amylopectin," Ind. Eng. Chem., 43(4):911–914 (1951).
Chasin, M., et al., "Polyanhydrides for Controlled Drug Delivery," *BioPharm.*, pp. 33–46 (1988).
Cheetham, N. W. H., "Synthesis of dithiobis(thioformate) and (S–methyl–dithiocarbonate) derivatives of cellulose and amylose, and some of their reactions," *Carbohydrate Res.*, 65:144–152 (1978).
Engelberg, I. and Kohn, J., "Physico–mechanical properties of degradable polymers used in medical applications; a comparative study," *Biomaterials*, 12:292–304 (1991).

*Primary Examiner*—Nathan M. Nutter
*Attorney, Agent, or Firm*—Arnall Golden & Gregory

[57] ABSTRACT

A thermoplastic biodegradable material is prepared from a continuous hydrophobic polysaccharide phase and a discontinuous phase of dispersed unmodified polysaccharide or bicontinuous phases of both. The material is easily processed into a wide variety of articles of manufacture that have sufficient physical properties for the intended use, yet degrades into nontoxic components in a reasonable timeframe in landfills or elsewhere in the environment.

16 Claims, No Drawings

POLYSACCHARIDE BASED BIODEGRADABLE THERMOPLASTIC MATERIALS

BACKGROUND OF THE INVENTION

This invention is in the area of biodegradable thermoplastic materials.

A number of nonbiodegradable plastics such as polyethylene, polypropylene, polystyrene, and polyurethane are now used extensively in place of metal and paper products for many applications, especially those where cost, durability, ease of manufacturing, availability of material and convenience are major considerations. One of the biggest problems with these plastics, however, is with disposal, since they have very low rates of degradation, if any. The problems with persistence of styrofoam hamburger containers and plastic six-pack holders are well known.

A number of biodegradable polymers which degrade by enzymatic or hydrolytic action have been proposed as substitutes for nonbiodegradable plastics, including poly(glycolic acid), poly(lactic acid) and copolymers thereof, polycaprolactone, poly(hydroxybutyrate), starch and cellulose. These materials have been suggested for a diverse range of applications, from biodegradable garbage bags to implantable drug delivery devices. Cost is a major consideration in many non-medical applications, however, since many of the synthetic biodegradable polymers are expensive to make, and are difficult to process easily or with the desired mechanical or physical and chemical properties.

Poly($\beta$-hydroxybutyrate) is an example of a degradable, biocompatible, thermoplastic polyester made by microorganisms. Engelberg and Kohn, *Biomaterials* 12, 292–304 (1991), evaluated the thermal properties of poly($\beta$-hydroxybutyrate) and found that the melting temperature, at 171° C., is very close to the upper limit of its thermal stability, making the material difficult to melt process into useful articles. Poly($\epsilon$-caprolactone) is an aliphatic polyester that degrades by a hydrolytic mechanism under physiological conditions. However, poly($\epsilon$-caprolactone) has a glass transition temperature of about −60° C. and is therefore always in a rubbery state at room temperature.

Starch has been evaluated for use as a polymer for use in manufacturing articles. It is very susceptible to enzymatic digestion by the enzyme $\alpha$-amylase which attacks the $\alpha$-D (1–4) glucosidic linkages. These linkages can be cleaved in either physiological or environmental conditions. However, starches form weak and brittle products. Starch is not thermoplastic by itself and therefore cannot be melt processed into useful products by extrusion, compression molding, injection molding, calendaring, or fiber spinning without the addition of significant quantities of plasticizers.

Probably the greatest disadvantage of using starch as a manufacturing material is that due to its hydrophilic nature, the water content of an object made from starch is difficult to control. This can lead to undesirable changes in the physical properties of the object, since physical properties are strongly tied to water content.

Blends of non-biodegradable plastics and cheap biodegradable fillers, such as starch, have been investigated. ECOSTAR™ is a blend of a starch that has been modified to render it hydrophobic and a traditional thermoplastic polymer such as linear low density polyethylene, high density polyethylene, polypropylene, or polystyrene (*Food Engineering* p. 29 (July 1988); Maddever and Chapman, "Modified Starch Based Biodegradable Plastics", *ANTEC '89, Soc. Plastics Eng.* Conference Proceedings pp. 1351–1355 (May 1–4, 1989)). An autooxidant is added to the blend to accelerate biodegradation. While these thermoplastics offer some advantages over other materials, they still incorporate traditional polymers that degrade very slowly or not at all.

Holland, Yasin, and Tighe, *Biomaterials* 11, 206–215 (1990), blended starch with hydroxybutyrate-hydroxyvalerate copolymers to manipulate the hydrolytic degradation process of the copolymer. Polysaccharides were added to the copolymer compositions to accelerate porosity development and thus enhance degradation rate.

A. T. Gros and R. O. Feuge, *J. Amer. Oil Chemists' Society* 39, 19 (1962), have derivatized amylose with fatty acids to modify the thermal and mechanical properties of starch. Similarly, I. A. Wolff, D. W. Olds, and G. E. Hilbert, *Ind. Eng. Chem.* 43:4, 911 (1951), have esterified corn starch, amylose, and amylopectin with various fatty acids to produce starch derivatives with varying thermal and mechanical properties.

Ferruti, Tanzi, and Vaccaroni, *Makromol. Chem.* 180, 375–382 (1979), prepared imidazolides derived from the succinic esters of starch and dextran, which undergo exchange reactions with alcohols or amines to give the corresponding polymeric esters or amides. However, these succinic esters were not designed to be thermoplastic (e.g., processable as a melt) or to have enhanced mechanical integrity.

There remains a need for a thermoplastic material that is easily processable into articles of manufacture that have sufficient physico-mechanical properties for the intended use, yet which are biodegradable in a reasonable timeframe into relatively nontoxic materials.

It is therefore an object of the present invention to provide a biodegradable thermoplastic material that is capable of being melt processed into articles that degrade under normal environmental conditions into relatively nontoxic materials.

It is a further object of the present invention to provide a method for making biodegradable materials which can be readily processed into articles of manufacture which exhibit a variety of mechanical and physical properties.

SUMMARY OF THE INVENTION

A thermoplastic biodegradable material is prepared from a continuous hydrophobic polysaccharide phase and a discontinuous phase of dispersed unmodified polysaccharide or bicontinuous phases of both. In a preferred embodiment, both polysaccharides are starches. Importantly, this thermoplastic material represents an advance in the art of materials science, in that it is easily processed into a wide variety of articles of manufacture that have sufficient physical properties for the intended use, yet it degrades into nontoxic components in a reasonable timeframe in landfills or elsewhere in the environment.

In one embodiment, hydrophobicity of the continuous starch phase is achieved by the partial or complete esterification of starch. Preferred esterifying agents are of the formula $RCO_2H$, wherein R is a straight or branched $C_1$–$C_6$ alkyl group, or mixtures thereof, or activated derivatives of the acids or mixtures of acids. The degree of hydrophobicity and physical properties of the modified starch, including processability, can be manipulated by the selection of the esterifying agent or agents. The hydrophobic starch esters degrade in a two step fashion. In the first step, the ester is removed by the action of microorganisms found in the environment. In the second stage, the deesterified starch is broken down by amylases.

In another embodiment, miscible blends or nonmiscible mixtures of hydrophobically modified starches are used as the continuous phase.

The thermoplastic material can include other materials, such as biodegradable polymers including cellulose esters, organic or inorganic filler materials, or plasticizers, to achieve desired properties.

The biodegradable starch-based thermoplastics can be molded into solid, three dimensional objects. Examples of these objects include disposable plastic items, such as plasticware, plates, cups, bowls, garbage bags, and food-wrap, which biodegrade in the environment to relatively nontoxic by-products.

DETAILED DESCRIPTION OF THE INVENTION

Polysaccharide-based materials are provided that have a continuous hydrophobic polysaccharide phase and a discontinuous phase of dispersed hydrophilic unmodified polysaccharide or bicontinuous phases of both. The materials are biodegradable and thermoplastic, and thus can be molded into a variety of articles of manufacture which will decompose in the environment after use.

The term "polysaccharide" refers to a material of the formula $(C_6H_{10}O_5)_n$. The term "starch" is typically applied to a carbohydrate produced by plants containing amylose and/or amylopectin. Amylose is the mainly unbranched type of starch, which consists of glucose residues in $\alpha$-1,4 linkages. Amylopectin is the branched form, and has roughly one $\alpha$-1,6 linkage for every thirty $\alpha$-1,4-linkages. Both amylose and amylopectin are rapidly hydrolyzed by enzymes called $\alpha$-amylases. Starch occurs as organized or structural granules of varying size or markings in many plant cells and hydrolyzes to several forms of dextrin and glucose.

Preferred starches include corn starch, rice starch, and wheat starch. Other starches of cereal origin are also preferred due to low cost and availability. Synthetic hydrophilic starches can also be used in the composition, including hydroxypropyl starch, hydroxyethyl starch, and hydroxymethyl starch.

Examples of useful natural and synthetic polysaccharides and polysaccharide derivatives other than starch are dextran, cellulose, cellulose acetate, methyl cellulose, ethyl cellulose, nitrocellulose, hydroxypropyl cellulose, hydroxypropyl methyl cellulose, hydroxybutyl methyl cellulose, cellulose propionate, cellulose acetate phthalate, carboxymethyl cellulose, cellulose triacetate, cellulose sulphate sodium salt, cellulose acetate butyrate, cellulose butyrate, and cellulose propionate.

As used herein, "thermoplastic" refers to a material that softens when heated and hardens when cooled; and "melt process" refers to the processing of thermoplastic materials in their softened state into useful articles.

The term hydrophobic, as used herein, refers to a material that absorbs 5% or less its weight of water when immersed in water under ambient conditions. The term hydrophilic, as used herein, refers to a material that absorbs greater than 5% water when immersed in water under ambient conditions.

Hydrophobic Polysaccharide Phase

Polysaccharides such as starch are not thermoplastic in their unmodified state and therefore cannot be used as the sole component in the manufacture of stable articles. Polysaccharides that have been modified into a hydrophobic material, however, are often thermoplastic, mechanically strong, and easily processable by extrusion, fiber spinning, injection molding, compression molding, or calendaring.

The specific properties of the materials, such as the mechanical strength, toughness, hydrophobicity, degradation rate, melting and glass transition temperatures, and processability, can be tailored by selection of the appropriate polysaccharide derivative. Hydrophobic polysaccharides, including hydrophobic starches, and their methods of manufacture, are known. A hydrophobic polysaccharide should be selected that degrades enzymatically or hydrolytically to the parent polysaccharide in the environment in a reasonable time period, optimally, less than five to ten years, and ideally, less than three years. The polysaccharide should be sufficiently hydrophobic that when included in the molding material in a desired amount with the hydrophilic polysaccharide, it minimizes water absorption by the molding material, yet, when placed in a landfill or otherwise in the environment for an extended period, it does not prevent the absorption of water by the hydrophilic component, and can be degraded in the resulting water-swollen environment.

Hydrophobic Starch Esters

In one embodiment, the polysaccharide, and in particular, a starch, is rendered hydrophobic by partial or complete esterification. Nonlimiting examples of esterifying agents are of the formula $RCO_2H$, wherein R is a $C_1$–$C_6$ straight or branched alkyl group, including acetic, propionic, butyric, pentanoic, hexanoic, isopropionic, 2-methylbutanoic, t-butylacetic, 3-methylbutanoic, 2,2-dimethylbutanoic, cyclopropylacetic, 2,3-dimethylbutanoic, 2-ethylbutanoic, (2, 3, or 4)-methylpentanoic, and 2-ethyl-2-methylbutanoic acids, or mixtures thereof. Preferred esters are acetate, propionate, butyrate, valerate, or mixtures thereof, for example, co-acetate-butyrate.

The degree of esterification can vary as desired from one to three per glucosidic unit of the starch, or as appropriate given the number of hydroxyl groups in the monomeric unit of the selected polysaccharide other than starch. Similar or different polysaccharides with varying degrees of esterification can be blended together to achieve a desired performance.

Starch butyrate triester is easily melt processable due to its low melting point. Starch acetate triester is a hard material that exhibits a higher melting temperature than starch butyrate triester, and therefore, depending on the application and processing requirements, it may be desirable to include a plasticizer or another low melting polymer. The butyrate ester is more pliable and tougher than the acetate ester, although it has a lower tensile strength. The butyrate ester is also more hydrophobic, and consequently has a slower degradation rate. To achieve a combination of the properties of these esters, a copolymer such as the starch butyrate-co-acetate can be used.

Esterified starches are stable to attack by amylases. In the environment, however, these esterified starches are attacked by microorganism secreting esterases, which hydrolyze the ester linkage. The unesterified starch produced thereby is then available to attack by amylases into the monomer units of starch, glucose and dextrin.

Process of Esterification

Processes for the esterification of polysaccharides are well known. Any of these processes can be used to prepare a thermoplastic hydrophobic polysaccharide for use in the molding material.

As a general and nonlimiting example of the esterification process, unmodified starch is placed in an aprotic polar solvent optionally with a catalyst to facilitate coupling. The selected carboxylic acid or its activated derivative is then added, and the reaction heated until completion. The product is then isolated and purified.

The term "activated derivative" refers to a carboxylic acid derivative that is more active toward esterification than the parent acid, and includes but is not limited to acid halides, and in particular, acid chlorides and anhydrides. An acid halide can be produced by reacting the carboxylic acid with thionyl chloride, preferably in benzene or toluene with a catalytic amount of dimethylformamide (DMF). A known method for producing anhydrides involves coupling two carboxylic acids in the presence of acetic anhydride. As acetic acid is formed, it is distilled out of the reaction vessel.

Examples of polar aprotic solvents are dialkyl formamides, dialkyl sulfoxides, p-dioxane, trialkyl amines, and pyridine. Pyridine, preferably at three to four times (or even six times) the molar quantity of starch glucose units, can be used as the catalyst. The anhydride or acid halide of the selected carboxylic acid is usually mixed into the starch solution at approximately two to four times the molar quantity of starch. Alternatively, one can use an acid catalyst, such as sulfuric acid or hydrochloric acid, to react an anhydride with the hydroxy group on the starch.

The reaction of the carboxylic acid derivative and the starch is preferably carried out in an inert atmosphere, for example nitrogen, often at an elevated temperature, typically between 70°–100° C., with stirring for approximately 6 to 24 hours. The product is then precipitated by addition of a nonsolvent. The product can be isolated in a number of ways, including but not limited to centrifugation, filtration, precipitation, or decantation of the supernatant.

EXAMPLE 1

Preparation of Starch Butyrate

The esterification of purified high-amylose starch (consisting of approximately 70% amylose and 30% amylopectin) was carried out as follows. Starch (0.1 mol, dried overnight in a vacuum oven at about 80° C. to minimize its moisture content) was placed in an Erlenmeyer flask, and 200 ml. of dioxane and 50 ml. of pyridine were added. This flask was then placed in an oil bath at 100° C., with a magnetic stirrer used for continuous vigorous mixing. Toluene (200 ml) and 0.45 moles of butyryl chloride were then added to the flask. After flushing the flask with nitrogen, and fitting it with a condenser, it was sealed. The reaction was allowed to continue for six hours at constant temperature, resulting in almost complete conversion of the starch. The starch tributyrate was subsequently separated from the reaction mixture and purified.

Hydrophilic Polysaccharide Phase

The hydrophilic polysaccharide phase preferably includes one or more unmodified polysaccharides, most preferably, starch. This material is included in the starch composition to increase the rate of biodegradation, to allow the formed article to swell in the presence of water in the environment, which facilitates the breakdown of the product, and to minimize the cost of the product.

In a preferred embodiment, between 30 and 50% by weight of a polysaccharide-based material which can be molded is a hydrophilic unmodified polysaccharide. The amount of polysaccharide used will affect the physical properties of the material, as unmodified polysaccharide has properties that are different, and sometimes substantially different, from a polysaccharide modified to render it hydrophobic. It is generally not preferred to use more than 50% by weight unmodified polysaccharide in a molding material, because the properties of the molding material would be dominated by the nonthermoplastic hydrophilic material.

Other Components in Molding Material

Polymers other than polysaccharides that are hydrolytically or enzymatically degraded in the environment in a useful timeframe, i.e., less than five to ten years, and optimally, less than three years, can be used in a material in combination with the hydrophobic polysaccharide derivative and unmodified hydrophilic polysaccharide to produce a material which can be extrusion molded or melt processed. Examples of suitable biodegradable polymers that can be included are polyhydroxyacids such as polylactic acid, polyglycolic acid, poly-dl-(lactic-co-glycolic acid), and poly(β-hydroxybutyrate), polyorthoesters, polyanhydrides, polyiminocarbonates, and poly(ε-caprolactone). The inclusion of these materials may substantially increase the cost of the article, and therefore, would not be preferred for low cost items.

The molding material can also optionally contain non-polymeric extenders or fillers such as clay, calcium carbonate, diatomaceous earth, alumina trihydrate, barium sulphate, talc, calcium silicate or magnesium silicate, and dyes or pigments.

A plasticizer can also be included to increase the processability of the molding material. A plasticizer is an organic compound added to a polymer both to facilitate processing and increase the flexibility and toughness of the final product by internal modification (solvation) of the polymer molecule. The plasticizer can be either primary (high compatibility) and secondary (limited compatibility). Among the more important plasticizers are non volatile organic liquids and low melting solids. Nonlimiting examples are phthalate (for example dioctyl phthalate), adipate, and sebicate esters, polyols such as ethylene glycol and its derivatives, tri-cresyl phosphate, and castor oil.

Excipients can be also mixed with the starch compositions to modify degradation rate. Examples of suitable excipients are unmodified polysaccharides and mono- and di-saccharides, as well as those additives which are normally added to starches to enhance degradation, for example, by photodegradation.

These additives can be blended in a solid or liquid form with the derivatized starch, which may be in a solid or softened form, by methods of blending known to those who are skilled in the art.

Preparation of a Moldable Material

Moldable material is prepared by mixing the selected hydrophobic polysaccharide with the selected hydrophilic polysaccharide in the desired weight ratio, and then mixing the materials together along with other additives as desired, using any method known to those skilled in the art, including by single or double screw extruder. In one embodiment, powdered hydrophobic polysaccharide is mixed with powdered hydrophilic polysaccharide, and the dry mixture melt extruded at a temperature high enough to soften or melt at least one of the components. In another embodiment, softened or melted hydrophobic polysaccharide is mixed with powdered hydrophilic polysaccharide, and the resulting mixture melt extruded. The degree of dispersity of the noncontinuous phase will be determined by the size of the powder particles used and the efficiency of mixing. If desired, the mixed material can be extruded one or more additional times to render the material more homogeneous.

EXAMPLE 2

Preparation of Starch Butyrate and Starch Composition

The starch tributyrate prepared in Example 1 was powdered and mixed with an equal weight of high-amylose starch powder (about 25 grams each). This mixture was slowly fed through a funnel into the feeder of a single-screw mixer (processing conditions: 170° C., screw speed: 25 RPM). The extrusion proceeded very smoothly, and the extruded material was fed through the mixer a second time to ensure good mixing. The final extruded material was light brown and quite hard. The two components appeared well mixed. This extrudate was also very water-stable indicating that the starch tributyrate was probably the continuous phase in the blend.

End uses

Any article that can be prepared by melt processing can be produced with the starch-based material disclosed herein. Nonlimiting examples are items of furniture, medical items, eating utensils, plastic bags, plastic containers, and plastic liners. This material is especially useful in the manufacture of items that are disposed of after one or several uses.

Modifications and variations of the present invention will be obvious to those skilled in the art from the foregoing detailed description. Such modifications and variations are intended to come within the scope of the following claims.

We claim:

1. A thermoplastic biodegradable material comprising a hydrophobic, thermoplastic polysaccharide and at least about 30% by weight of a hydrophilic, unmodified, non-thermoplastic polysaccharide.

2. The material of claim 1, wherein the hydrophilic polysaccharide is unmodified starch.

3. The material of claim 1, wherein the hydrophobic polysaccharide is an esterified starch.

4. The material of claim 3, wherein the ester moiety is of the formula $RCO_2$—, wherein R is a straight or branched $C_1$-$C_6$ alkyl group.

5. The material of claim 1, wherein the hydrophilic and hydrophobic polysaccharides are both starches.

6. The material of claim 1, wherein the hydrophilic, unmodified polysaccharide is a starch selected from the group consisting of corn starch, rice starch, and wheat starch.

7. The material of claim 1, wherein the hydrophobic polysaccharide comprises a starch selected from the group consisting of starch acetate, starch propionate, starch butyrate, starch valerate, starch acetate-co-butyrate, and mixtures thereof.

8. The material of claim 1, wherein the hydrophobic polysaccharide is partially esterified.

9. A method for making a thermoplastic biodegradable material comprising mixing a hydrophobic, thermoplastic polysaccharide with at least about 30% by weight of a hydrophilic, unmodified, non-thermoplastic polysaccharide.

10. The method of claim 9, wherein the hydrophilic polysaccharide is unmodified starch.

11. The method of claim 9, wherein the hydrophobic polysaccharide is an esterified starch.

12. The method of claim 11, wherein the ester moiety is of the formula $RCO_2$—, wherein R is a straight or branched $C_1$-$C_6$ alkyl group.

13. The method of claim 9, wherein the hydrophilic and hydrophobic polysaccharides are both starches.

14. The method of claim 9, wherein the hydrophilic, unmodified polysaccharide is a starch selected from the group consisting of corn starch, rice starch, and wheat starch.

15. The method of claim 9, wherein the hydrophobic polysaccharide comprises a starch selected from the group consisting of starch acetate, starch propionate, starch butyrate, starch valerate, starch acetate-co-butyrate, and mixtures thereof.

16. The method of claim 9, wherein the hydrophobic polysaccharide is partially esterified.

* * * * *